Feb. 27, 1951 E. M. BOWEN 2,542,986
MACHINE TOOL
Filed July 5, 1946 5 Sheets-Sheet 2

Feb. 27, 1951 E. M. BOWEN 2,542,986
MACHINE TOOL

Filed July 5, 1946 5 Sheets-Sheet 3

INVENTOR
Earl M Bowen
ATTORNEYS

UNITED STATES PATENT OFFICE 2,542,986

MACHINE TOOL

Earl M. Bowen, Rockford, Ill., assignor to The Ingersoll Milling Machine Company, Rockford, Ill., a corporation of Illinois Application July 5, 1946, Serial No. 681,537

15 Claims. (Cl. 90—21)

This invention relates to machine tools for performing metal removing operations such as milling, and has more particular reference to the loading of the workpieces and positioning the same in such machines in proper relation to one or more metal removing cutters.

One object is to provide a machine tool of the above character in which successive workpieces are transferred into the machine fixture by a tiltable power actuated support to which each piece is attached during the transfer.

Another object is to utilize a tiltable loading support of the above character for delivering successive workpieces to an approximate position in the machine fixture together with means for thereafter effecting accurate positioning and clamping of the pieces preparatory to machining thereof.

The invention also resides in the novel structural character of the loading support and the work clamping and positioning mechanisms.

Other objects and advantages of the invention will become apparent from the following detailed description taken in connection with the accompanying drawings, in which.

The machine tool shown in the drawings to illustrate the invention is adapted to simultaneously mill off the top, side, and bottom surfaces 10, 11, and 12 of an internal combustion engine block W having opposite end walls 13 and 14 and an outturned peripheral bottom flange 15. The milling operations are performed by face milling cutters 16, 17, and 18, power driven and rotatably mounted on a bridge structure 19 overlying the fixture 20 in which the workpiece is supported.

The fixture is secured to the top of a carriage 21 supported by and slidable along guideways 22 on the machine bed 23. Reciprocation of the carriage back and forth along its guides is effected by rotation of a power driven screw 24 cooperating with a rack 25 on the underside of the carriage.

The fixture comprises a casting keyed to the carriage 21 and having upwardly facing hardened bosses 26, four in the present instance, for supporting the workpiece through the medium of previously milled bosses 27 on the side opposite the manifold pad 11. Thus, when the workpiece is supported on the bosses 26, the manifold pad is located in the proper position relative to the cutter 17 by which it is milled. To locate the work accurately for milling the top and bottom surfaces 10 and 12, the block W is shifted laterally in the fixture and to the left as viewed in Fig. 6 until the lower part of the flange 15 comes against horizontally facing stops 28. The block is located endwise in the fixture against a stop 29 (Figs. 4 and 5) which is positioned to engage the end wall of the block.

Figure 1:
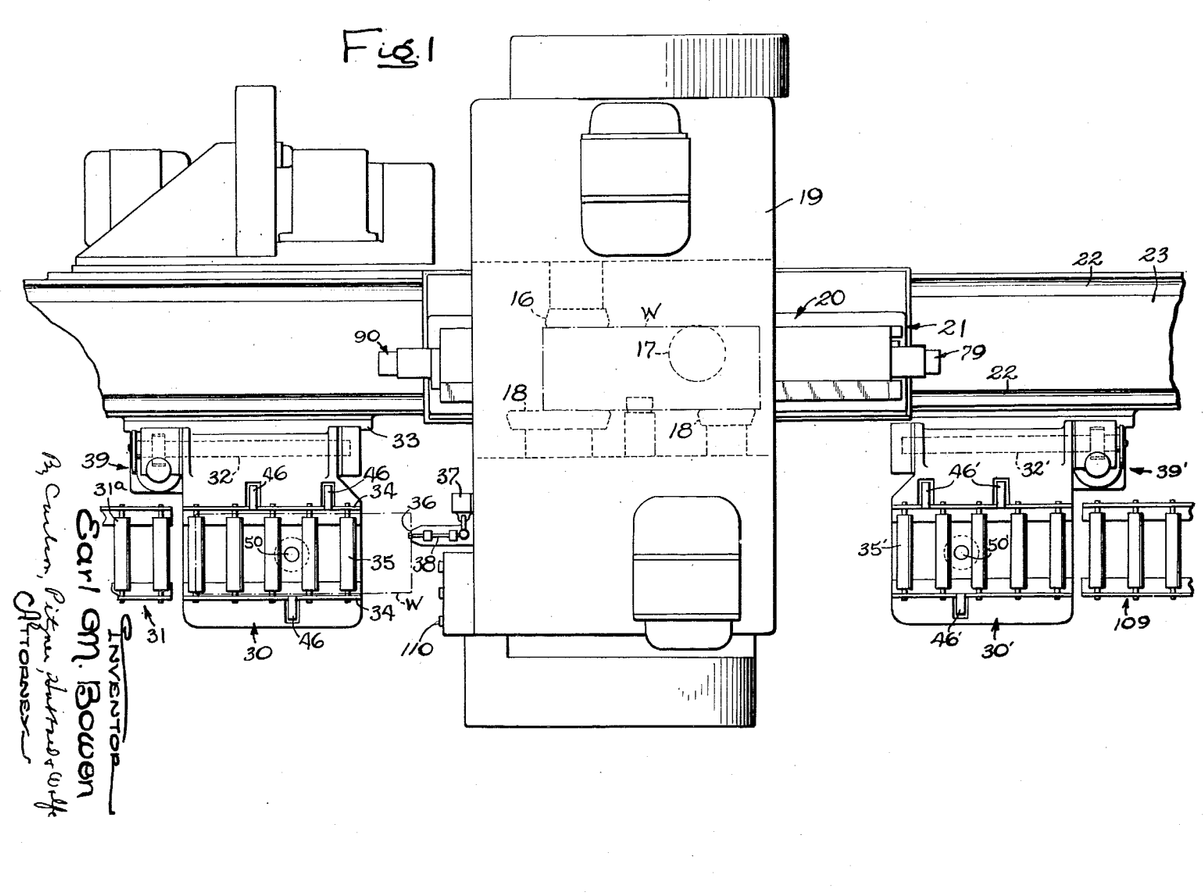
Figure 1 is a plan view of a milling machine embodying the novel features of the invention.

The successive workpieces to be machined are lowered one by one into the fixture by means of a movable support 30 which, while in horizontal position (Fig. 1) receives the block from a horizontal conveyor 31. The loading support comprises a platform pivoted along one margin to a shaft 32 journaled in the upper part of a bracket 33 which is bolted to the side of the machine bed 23. Rails 34 secured to the top of the platform 30 serve as guides for each workpiece advanced onto the platform and support the opposite ends of rollers 35 for supporting the workpiece. When the platform is lowered as shown in full outline in Fig. 1, the work supporting surfaces formed by the rollers lies in the plane of similar rollers 31ᵃ on the stationary conveyor 31. The extent of advance of the leading workpiece onto the platform 30 is determined by a stationary stop 36 (Fig. 2), the presence of the workpiece in proper position being detected by actuation of a rod 38 to actuate a switch 37 as the workpiece encounters the stop 36.

The platform 30 is swung between horizontal and vertical positions by a power actuator 39 which, in this instance, comprises a vertical cylinder 40 on the bracket 33 having a piston 41 whose rod carries a rack bar 42 meshing with a gear 43 fast on the shaft 32. Pressure fluid is directed to opposite ends of the cylinder 40 by electromagnetic valves (not shown) under the control of a switch 44 which is operated by dogs 45 at opposite limit positions of the actuator in which the platform 30 is respectively disposed horizontally as shown in full outline in Fig. 2 and vertically as shown in phantom in this figure.

Means is provided for clamping the workpiece to the platform 30 while the two are being tilted to deliver the workpiece into the fixture. This means comprises three jaws 46 projecting up through holes in the platform 30 and formed on the ends of bell cranks 47 which are pivoted at 48 on the underside of the platform. There are two bell cranks on one side of the workpiece and one on the other, their other arms 49 being pivotally connected to a plunger 50. The latter is mounted in guides on the underside of the platform for movement perpendicular to the rollers 35. This plunger is moved back and forth by admission of pressure fluid to opposite ends of a cylinder 51 rigid with the underside of the platform and having a piston 52 whose rod carries the plunger 50. When the plunger is raised, the bell cranks 47 are rocked to move the jaws 46 outwardly as shown in phantom in Fig. 2, thereby releasing the workpiece from the platform. Lowering of the plunger to the position shown in full outline in Fig. 2 swings the jaws inwardly toward each other to bring the upwardly and inwardly inclined undersurfaces of the jaws into engagement with the work flanges 15 which the jaws overlie and force against the rollers 35 thereby clamping the workpiece rigidly to the platform. If the workpiece is not accurately centered laterally of the support 30, the inclined surface of one of the jaws 46' will engage one work flange 15 before the other, and, as a result, the workpiece will be shifted laterally relative to the platform until the jaw on the other side is encountered whereupon the clamping force is applied. By thus shaping the jaws and actuating the same by a single power operator, the workpiece is always centered laterally on the support 30 which is advantageous in enabling the workpiece, as it is transferred to the fixture 20, to always be located close to the supporting bosses 26.

As an incident to tilting of the platform 30 from the horizontal position to the vertical position, the workpiece clamped thereon is tipped on its side and is carried laterally to a position immediately above the upwardly facing supporting abutments 26 on the fixture 20 with the depending work flange 15 spaced from but close to the fixture abutments 28. During such transfer into the fixture, the workpiece, even though it may be top-heavy as illustrated, remains fastened to the support 30 in a predetermined position and is thus prevented from tipping or sliding off from the support. Now, when the clamping jaws 46 are released, the workpiece will be lowered slightly onto the abutments 26, the workpiece then being located approximately in its final operating position. The platform 30 may then be swung back to its horizontal position to receive the next workpiece.

Figure 2:
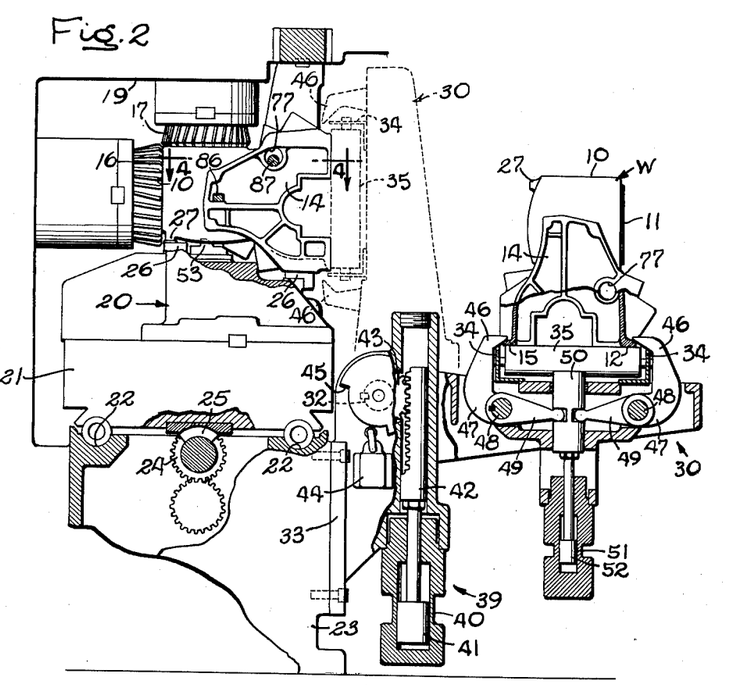
Fig. 2 is an end view with certain of the parts broken away and shown in section.
Figure 3:
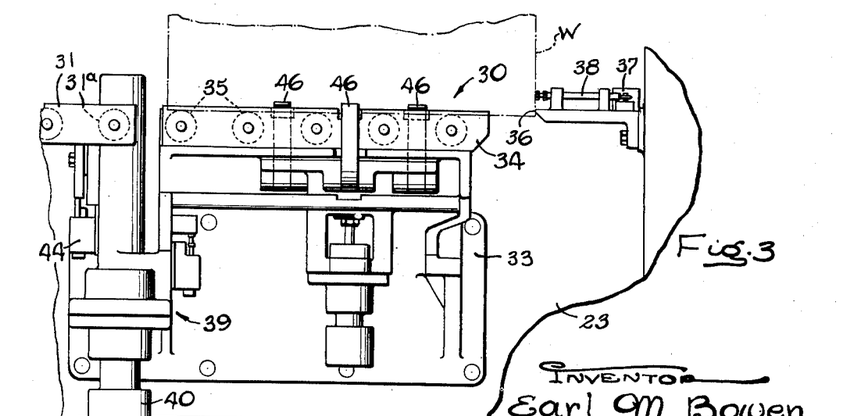
Fig. 3 is a fragmentary side elevational view of the loading support.
Figure 5:
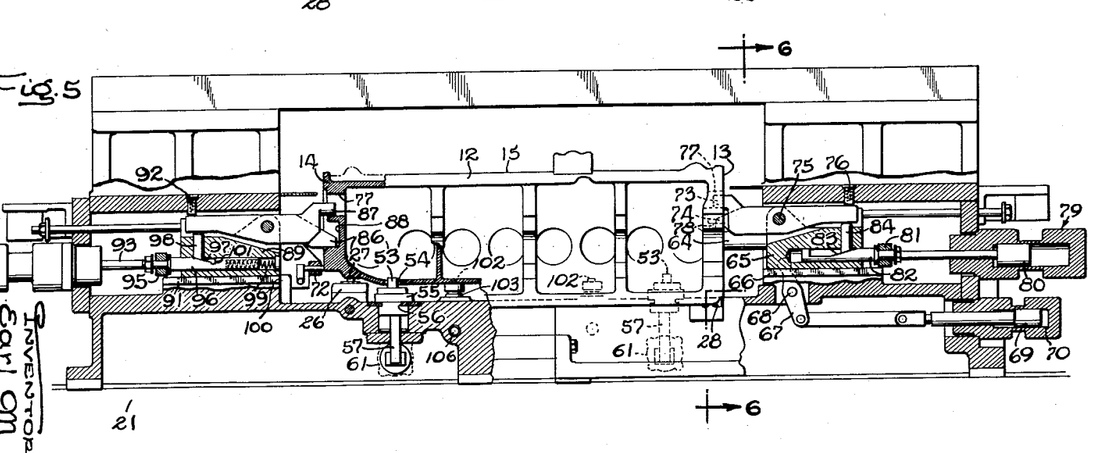
Fig. 5 is a sectional view taken along the line 5—5 of Fig. 4.
Figure 6:
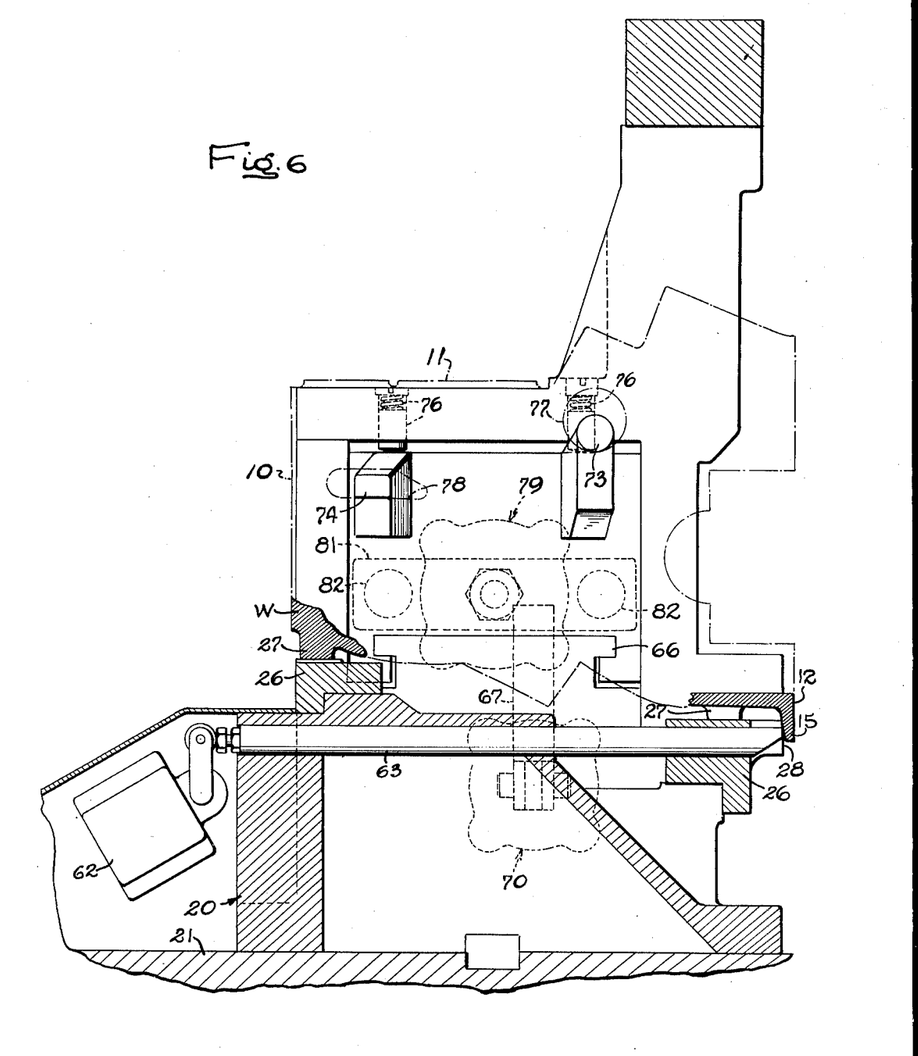
Fig. 6 is a section taken along the line 6—6 of Fig. 5.
Figure 7:
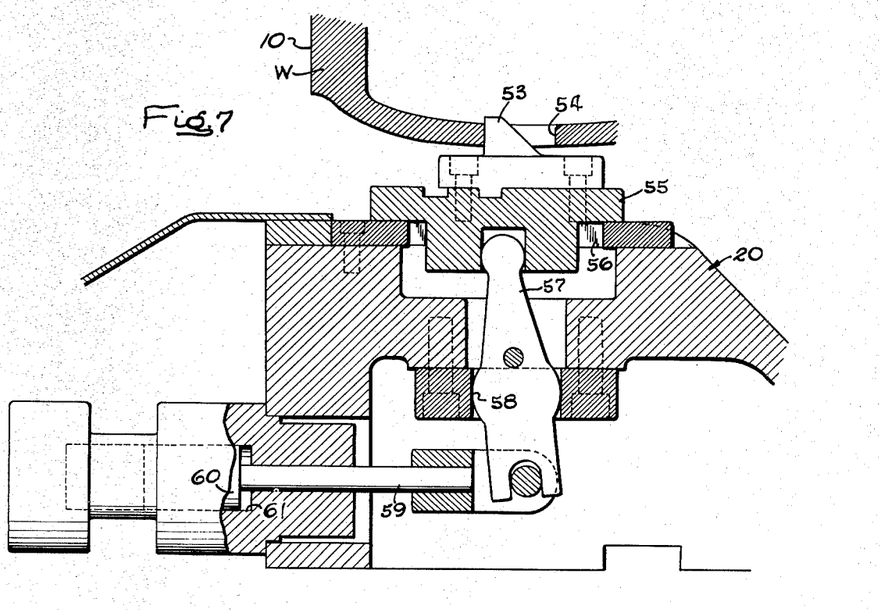
Figs. 7 and 8 are fragmentary sections taken along the lines 7—7 and 8—8 respectively of Fig. 4.

To position the workpiece accurately in the fixture against the locating abutments 28 and 29, the piece is first shifted laterally of the work carriage 21 and then longitudinally thereof. The lateral shifting, to the left as viewed in Figs. 2 and 6, is effected by two fingers 53 (Figs. 2, 4, 5, and 7) upstanding from the upper surface of the fixture in positions to enter holes 54 in the side of the workpiece when the latter is deposited in the fixture. The fingers 53 are on slides 55 which move transversely of the table along guideways 56 and are pivotally connected to the upper ends of levers 57. The latter are fulcrumed at 58 in the fixture base and connected at their lower ends to rods 59 each carrying a piston 60 in a cylinder 61 on the fixture base. By admitting pressure fluid to the head end of the cylinder 61, the finger 53 then projecting up through the work hole 54 is shifted to the left as viewed in Fig. 7, thereby engaging the wall of the hole and shifting the workpiece bodily along the fixture abutments 26 to bring the work flange 15 against both of the abutments 28. Correct positioning of the workpiece against these abutments is detected by switches 62 (Fig. 6) actuated by rods 63 which are engaged and moved by the work flange 15 as it reaches the abutments 28.

The hydraulic actuators 60, 61 remain energized and thus maintain the lateral location of the workpiece during the shifting of the latter longitudinally of the work carriage to bring the workpiece to its final location against the stop 29. This is accomplished by a projection 64 (Figs. 4 and 5) which engages the end wall 13 of the workpiece and projects rigidly from the forward end of a slide 65 guided in ways 66 on the fixture base and extending longitudinally of the work carriage. On its inner side the slide is connected to the upper end of a lever 67 pivoted on the fixture at 68 and linked at its lower end to the rod of a piston 69 slidable in a cylinder 70. By admitting fluid to opposite ends of this cylinder, the slide 65 may be shifted either backwardly to retract the projection 64 or forwardly to move the projection against the workpiece and then slide the latter in the fixture until the stop 29 is encountered. Correct positioning of the workpiece against this stop is detected by a switch 71 (Fig. 4) actuated through links and levers from a pin 72 which is engaged and moved by the workpiece as it reaches the stop 29.

Means is provided for clamping the workpiece rigidly in the fixture after final positioning thereof, the clamping means being retractible out of the path along which the workpiece is transferred into and out of the fixture. The means for clamping one end of the workpiece is formed by two members 73 and 74 in the form of levers each fulcrumed intermediate its ends an a pin 75 carried by the slide 65. The forward end of each lever projects from the slide and is urged upwardly by a spring 76 bearing downwardly on the other end of the lever. The lever 73 is so positioned on the slide 65 that it will enter the cam shaft hole 77 in the end wall 13 of the engine block as the slide 65 is advanced with the clamping lever 73 in released position. Then, as the lever is swung downwardly, the outer end engages the bottom of the hole 77 thereby exerting a clamping force on the workpiece. In a similar way, the outer end of the other lever 74 is projected over a ledge 78 on the block wall 13 as the slide 65 is advanced and is brought into clamping engagement by locking of the rear end of the lever downwardly.

Figure 4:
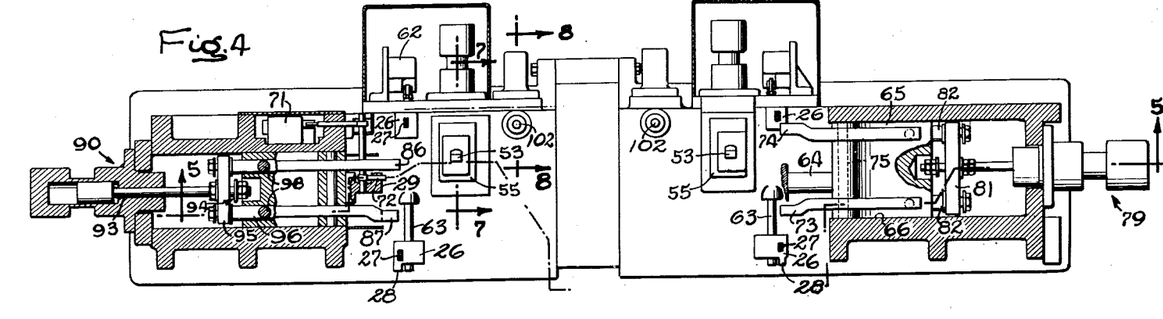
Fig. 4 is a section taken along the line 4—4 of Fig. 2.

The levers 73 and 74 are moved simultaneously into clamping engagement with the work by a hydraulic actuator 79 mounted on the fixture 20 and having its piston 80 connected to a crosspiece 81 joined at opposite ends to the rear ends of cam bars 82 which are guided in the slide 65. To provide some differential action for allowing both clamps to come against the work, modified ball and socket connections with some lost motion, as shown in Figs. 4 and 5, are employed between the equalizing bar 81, the piston rod, and the levers. Each bar has an inclined cam surface 83 adapted to act on a follower pin 84 that bears upwardly against the inner end of the clamping lever so as to effect a clamping movement thereof when the plunger is raised in the advance of the piston 80 to the position shown in Fig. 5. As the follower rides down the incline 83 onto the adjacent horizontal surface during retraction of the cam bar, the active end of the clamping lever is raised thereby releasing the clamp. Then, as the slide 65 is retracted by the actuator 69, 70, the outer ends of both clamping levers 73 and 74 are withdrawn out of engagement with the end wall 13 of the workpiece. Thus, it will be seen that the clamping levers are moved into and out of engaging relation with respect to the end wall 13 during the advance and retraction of the slide 65 while these levers are actuated to engage and clamp the work when their cam bars are advanced by the actuator 79.

Similar clamping levers 86 and 87 are provided at the other end of the fixture for projection of their outer ends into a camshaft hole 77 and a recess 88 in the other end wall 14 of the block W in the advance of a slide 89 by a hydraulic actuator 90. This slide is guided in ways 91 on the fixture base, the levers 86 and 87 being pivoted on the slide and urged in the releasing direction by springs 92. The piston rod 93 of the actuator 90 has a limited lost motion connection 94 with a crosspiece 95, the opposite ends of which are connected to cam bars 96 through modified ball and socket joints which provide some lost motion thereby permitting of an equalizing action by the crosspiece 95 to cause equal forces to be applied to the work by the two clamps. These bars carry inclines 97 acting on follower pins 98 that bear upwardly against the rear ends of the clamping levers. The bars are guided for endwise movement in the slide 89 to which the inner ends of the bars are connected through a compression spring 99. Thus, as the piston rod 93 is advanced, the slide 89 and the clamping levers 86 and 87 thereon move forwardly together until the outer ends of the levers have entered the work recesses 77 and 88 and the slide 89 has encountered a stop 100 on the fixture. In the continued movement of the actuator rod 93, the cam bars 96 advance relative to the slide 89 and cam the levers 86 and 87 downwardly into clamping engagement with the work ledges as shown in Figs. 4 and 5. During retraction of the piston rod 93, the cam bars 96 first move relative to the slide to release the clamps and then when a shoulder 101 on the cam bars engages the follower pins 98, the bars and slide move in unison to retract the clamping levers out of the work wall 14.

The operation of the actuators for all four of the clamps takes place simultaneously thereby locking the work securely in the fixture. When the clamps are released and withdrawn as described above, the workpiece in the fixture may be tipped out laterally at the unloading station of the machine, and the next block may be delivered into the fixture after return of the latter to the loading station.

Figure 8:
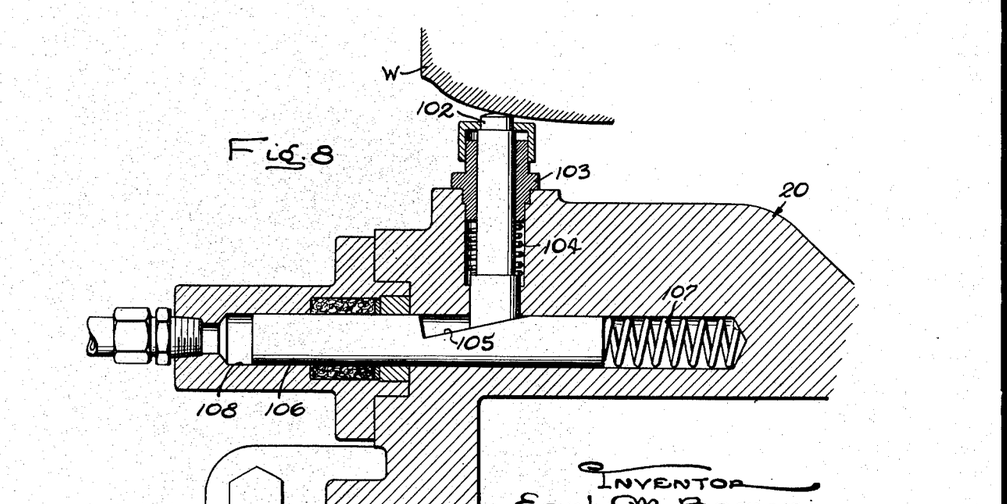

If desired, auxiliary means may be used to provide additional supports for the workpiece in the fixture, such supports being adaptable automatically to the contour of the underside of the workpiece after location and clamping of the latter in the fixture. As shown in Fig. 8, each auxiliary support comprises a pin 102 vertically slidable in the guide 103 on the fixture and urged downwardly by a spring 104. The lower end of the pin rests on an inclined cam surface 105 on a rod 106 horizontally slidable in the fixture base and urged outwardly by a spring 107 so that the cam 105 normally tends to raise the pin into engagement with the underside of the workpiece as shown in Fig. 8. The incline is so small that the pin is locked and provides a rigid backing for the work.

The other end of the rod 106 constitutes a piston slidable in a cylinder 108 to which pressure fluid may be admitted to force the rod in a direction to release the pin 102. When the fluid pressure is released, which takes place in the proper time in the machine cycle, the rod 106 is moved by the spring 107 thereby raising the pin into engagement with the workpiece. The auxiliary supports thus provided adapt themselves automatically to the contour of the underside of the work.

After location and clamping of the workpiece in the fixture in the manner described above, the work carriage 21 is fed forwardly to carry the work past the milling cutters and to the unloading station at the other end of the machine bed. This station is equipped with an unloading platform 30' which is of the same construction as the loading platform 30, and is equipped with rollers 35', clamps 46', etc. which are actuated in the same manner as the corresponding parts of the loading mechanism. Thus, when the platform 30' is raised with the work carriage in the unloading position, the clamps 46' thereof are brought into positions to engage the work flange 15 and clamp the piece to the platform rollers 35' as the clamping jaws are closed by their power operator. The piece may then be removed from the work carriage and tilted laterally into horizontal position by rocking the platform 30' downwardly. Then, after release of the clamps 46', the machined workpiece may be slid off from the platform onto a conveyor 109.

Operation

The various hydraulic actuators for the loading and unloading platforms 30 and 30', the clamps 46 and 46' thereon, the slides 65 and 89, and the clamps 73, 74, 86, 87, the positioning fingers 53, the auxiliary supports 102, and the operator for reciprocating the work carriage 21 are adapted to be controlled by electromagnetic valves or switches (not shown) and to operate sequentially in an automatic cycle which is initiated under manual control. Various interlocks controlled by the work position detecting switches and the motions of the various machine parts are, of course, provided. The complete cycle is as follows, assuming that the work carriage 21 is retracted to the loading position opposite the loading platform 30 with the latter lowered and supporting a workpiece W pushed against the stop 36. The cycle is initiated by depression of a push button switch 110 (Fig. 1) to energize the actuator for closing the clamps onto the work to fasten the latter to the platform 30. The actuator 39 is then energized to swing the platform upwardly and to the left as viewed in Fig. 2 to the position shown therein in phantom, thereby transferring the workpiece into the fixture 20 where it is deposited on the supporting abutments 26, the fingers 53 entering the holes 54 in the workpiece. Next, these fingers are actuated to shift the workpiece to the left as viewed in Fig. 2 until the work flange 15 comes into engagement with both of the stops 28.

The actuator 69, 70 is then energized to advance the slide 65 whereby to move the workpiece longitudinally of the work carriage until it encounters the stop 29, the piece then being located in its final position in proper relation with respect to the cutting planes of the cutters 16, 17, and 18. Clamping of the piece in this position is effected as described above by energizing the hydraulic actuators 79 and 90, the auxiliary supports 102 being raised at the same time into engagement with the underside of the workpiece. As the work carriage is then fed forwardly out of the loading position, the cutters perform their metal removing operations and pass out of engagement with the work by the time the latter reaches the unloading position opposite the platform 30'. In the meantime, the actuator 39 for the loading platform is energized to lower the latter to horizontal position in which it is adapted to receive the next workpiece from the conveyor 31.

The unloading platform 30' is raised to vertical position when the machined workpiece arrives at the unloading station so that upon energization of the clamping actuator, the clamping jaws 46' move inwardly to engage the work flange 15 and clamp the workpiece to the rollers 35'. The platform 30' is then lowered to horizontal position from which the machined workpiece may be pushed off onto the conveyor 109. The cycle is repeated by rapid traversing of the work carriage 21 back to loading position.

I claim as my invention:

1. A machine tool having, in combination, a work support and a cutter mounted for relative reciprocatory movement to effect machining of a workpiece mounted in a predetermined position on the work support, stops on said work support facing in two transverse directions to locate said workpiece, shifting means mounted on said work support and movable relative thereto to shift the workpiece along the work support against the respective stops, a loading support adapted to receive a workpiece and tiltable from a substantially horizontal position to a vertical position to deposit the tilted workpiece onto said work support in operative association and short of said shifting means and said stops, means on said loading support engageable with the workpiece thereon to clamp the workpiece thereto and hold the same in a predetermined position during tilting, and means to clamp the workpiece on said work support for operation of the cutter thereon.

2. A machine tool having, in combination, a work support and a cutter mounted for relative reciprocatory movement to machine a workpiece mounted in a predetermined position on said work support, a loading support for receiving a workpiece when in substantially horizontal position and tiltable in a vertical plane out of said horizontal position to present the correspondingly tilted workpiece to said work support and locate the same approximately in said position, means on said loading support engageable with the workpiece thereon to clamp the same to the support and hold the workpiece in a predetermined position relative to the loading support during tilting of the latter, said clamping means being releasable to free the workpiece after delivery thereof to said work support, means spaced from the workpiece deposited on said work support and engageable therewith to shift the workpiece in two transverse directions and locate the workpiece accurately in said predetermined position, and means to clamp the located workpiece to said work support for operation of said cutter thereon.

3. In a machine tool, the combination of a horizontal work support, a platform mounted alongside said support to swing vertically from a horizontal position to a substantially vertical position at the edge of said work support, said platform being adapted to receive a workpiece having outwardly projecting flanges along opposite sides thereof, bell crank levers pivoted on said platform and having arms swingable into and out of overlying engagement with said work flanges to clamp the workpiece to said platform, and a power actuator movable with said platform and operable to actuate said levers to clamp the workpiece when the platform is in one position and to retract the clamp arms while the platform is in its other position.

4. In a machine tool having a work support and a cutter mounted for relative movement to machine a workpiece mounted in a predetermined position on said work support, the combination of, a loading support for receiving a workpiece when in substantially horizontal position and tiltable in a vertical plane out of said horizontal position to deposit the tilted workpiece onto said work support and locate the same approximately in said position, and means on said loading support engageable with the workpiece thereon to clamp the same to the support during tilting of the latter, said clamping means being releasable to free the workpiece after delivery thereof to said work support.

5. In a machine tool having a work support and a cutter mounted for relative movement to machine a workpiece mounted on said work support, the combination of, a loading support for receiving a workpiece when in one position and tiltable out of such position to present the workpiece to said work support, clamping members mounted on said loading support for movement relative thereto to engage the workpiece thereon to clamp the same to the support during tilting of the latter, said clamping members being retractible to free the workpiece after delivery thereof to said work support, and power actuated means on said loading support to actuate said clamping members to clamp and release the workpiece.

6. In a machine tool, the combination of, a work support, a platform for receiving a workpiece when in substantially horizontal position and tiltable out of said horizontal position about a horizontal axis adjacent said support to present the correspondingly tilted workpiece to said work support, clamping members on said platform movable relative thereto toward each other into and out of engagement with opposite sides of the workpiece to clamp the same to the platform or release the same from the platform, said members having inclined bottom edges converging upwardly and toward each other and operable during movement of the members toward each other to center the workpiece on the platform before clamping of the workpiece, and power actuated means for operating said clamping members.

7. In a machine tool, the combination of, a work support and a cutter mounted for relative reciprocatory movement to effect machining of a workpiece mounted in a predetermined position on the work support, stops on said work support facing in two transverse directions to locate said workpiece in said predetermined position, work transferring means for supporting a workpiece and moving the same laterally to deposit the workpiece onto said support approximately in said position, shifting means mounted on said work support and movable relative thereto to shift the workpiece along the work support in two transverse directions to bring the workpiece against the respective stops, clamps mounted on said work support for bodily movement into and out of the path of transfer of the workpiece, and power actuated means operable when said clamps are advanced into said path to move the clamps into engagement with said workpiece and secure the latter to said support.

8. In a machine tool, the combination of, a work support, stops on said work support facing in two transverse directions to locate said workpiece in a predetermined position, work transferring means for supporting a workpiece and moving the latter laterally onto said support closely adjacent said stops, means mounted on said work support and movable relative thereto to shift the workpiece along the work support in two transverse directions to bring the workpiece against the respective stops, and power actuated clamps mounted on said work support and operable to engage the positioned workpiece and secure the latter to said support.

9. In a machine tool, the combination of, a work support, means for releasably supporting a workpiece and transferring the same bodily onto said support, means for laterally shifting the workpiece thus deposited on the work support to locate the same in a predetermined position relative to the support, a slide mounted on said support for movement toward and away from the workpiece, a clamping member mounted on said slide for movement relative thereto toward and away from said support, and power actuated means for successively advancing said slide to present said clamping member to said workpiece and then move the member relative to the slide toward said work support to engage and clamp the workpiece thereto.

10. In a machine tool, the combination of a platform for receiving a workpiece slid horizontally onto the platform, a stop for limiting the sliding movement of the workpiece to locate the latter in one direction relative to said platform, clamping members on opposite sides of the positioned workpiece mounted on said platform for movement toward the workpiece in a transverse direction to first center the workpiece and then clamp the same to the platform, means supporting said platform for swinging thereof back and forth between horizontal and upright positions about an axis extending along one side of the platform, power actuated mechanism for swinging said platform between said positions, a single power actuator mounted on said platform for movement therewith and operable to move both of said clamping members simultaneously toward and away from each other to clamp a workpiece to the platform or to release the workpiece, and a work supporting fixture laterally spaced from said platform for engaging and receiving the workpiece upon release of said clamping members while the platform is disposed in said upright position.

11. In a machine tool, the combination of a platform mounted to swing from a horizontal position to an upright position about an axis extending along one side of the platform, said platform, when in said horizontal position, being adapted to receive a workpiece slid horizontally onto the platform, clamping members on opposite sides of the workpiece on said platform mounted on the platform for movement toward the workpiece to first center the workpiece across the supporting surface of the platform and then clamp the workpiece to the platform, and a single power actuator mounted on said platform for movement therewith and operable to move both of said clamping members simultaneously toward and away from each other to clamp a workpiece to the platform or to release the workpiece.

12. In a machine tool, the combination of a platform for receiving a workpiece slid horizontally onto the platform, a stop for limiting the movement of the workpiece to locate the latter in one direction relative to said platform, clamping means mounted on said platform for movement into engagement with the workpiece to position the same in a transverse direction and then clamp the same to the platform, means supporting said platform for swinging thereof back and forth between horizontal and upright positions about an axis extending along one side of the platform, a power actuator mounted on said platform for movement therewith and operable to actuate said clamping means to clamp a workpiece to the platform or to release the workpiece therefrom, and a work supporting fixture laterally spaced from said platform for engaging and receiving the workpiece upon release of said clamping means while the platform is disposed in said upright position.

13. In a machine tool having a work support and a cutter mounted for relative movement to machine a workpiece mounted in a predetermined position on said work support, the combination of, a platform tiltable between a first position and a second position adjacent a workpiece on said work support, a clamp mounted on and swingable with said platform and movable relative thereto into and out of clamping engagement with a workpiece engaging the platform when the latter is in said first position or into and out of engagement with a workpiece on said work support when the platform is in said second position, said clamp when engaging the workpiece acting to fasten the latter rigidly to said platform during swinging of the platform to the other position, and a power actuator operable when said platform is disposed in either of said positions to move said clamp relative thereto to engage or disengage the workpiece.

14. In a machine tool having a work support and a cutter mounted for relative movement to machine a workpiece mounted in a predetermined position on said work support, the combination of, a platform swingable about a fixed axis between a first position and a second position adjacent a workpiece on said work support, a power actuated clamp mounted on said platform and adapted when energized with the platform in either of said positions to grip the adjacent workpiece and hold the same rigidly against the platform during swinging of the latter to the other of said positions, said clamp when deenergized, releasing the workpiece to permit separation of the workpiece and platform, and a power actuator operable to move said platform back and forth between said two positions.

15. In a working tool, the combination of a platform for supporting a workpiece, members mounted on said platform for movement toward the workpiece to locate the workpiece in one direction relative to the platform and to clamp the piece to the platform, means supporting said platform for swinging thereof back and forth between two positions and about an axis disposed adjacent one side of the platform, power actuated mechanism for swinging said platform between said positions, a second power actuated mechanism for operating said members to locate and clamp the workpiece on said platform, and a work-supporting fixture spaced laterally from said platform for supporting a workpiece in a position for engagement by said members when said platform is in one of said positions.

EARL M. BOWEN.

REFERENCES CITED

The following references are of record in the file of this patent:

UNITED STATES PATENTS

| Number | Name | Date |
|---|---|---|
| 1,029,656 | Zimmermann | June 18, 1912 |
| 1,834,075 | Shambow | Dec. 1, 1931 |
| 1,960,884 | Wilson | May 29, 1934 |
| 2,142,735 | Rougemont | Jan. 3, 1939 |
| 2,235,832 | Freeman | Mar. 25, 1941 |
| 2,264,508 | Carson | Dec. 2, 1941 |
| 2,326,847 | Fanning | Aug. 17, 1943 |